United States Patent
Putzig

(10) Patent No.: US 7,795,187 B2
(45) Date of Patent: Sep. 14, 2010

(54) PERMEABLE ZONE AND LEAK PLUGGING USING CROSS-LINKING COMPOSITION COMPRISING ZIRCONIUM TRIETHANOLAMINE COMPLEX

(75) Inventor: Donald Edward Putzig, Newark, DE (US)

(73) Assignee: E.I. du Pont de Nemours and Company

( * ) Notice: Subject to any disclaimer, the term of this patent is extended or adjusted under 35 U.S.C. 154(b) by 663 days.

(21) Appl. No.: 11/353,771

(22) Filed: Feb. 14, 2006

(65) Prior Publication Data

US 2007/0191236 A1 Aug. 16, 2007

(51) Int. Cl.
*C23F 11/18* (2006.01)
*C23F 11/14* (2006.01)
*C09K 8/60* (2006.01)
*C09K 8/72* (2006.01)
*C09K 8/528* (2006.01)

(52) U.S. Cl. .................. 507/271; 507/219; 507/215; 507/236; 507/251

(58) Field of Classification Search .......... 507/271, 507/219, 215, 236, 251
See application file for complete search history.

(56) References Cited

U.S. PATENT DOCUMENTS

| | | | | |
|---|---|---|---|---|
| 2,994,660 | A * | 8/1961 | Reddie et al. | 507/133 |
| 4,460,751 | A | 7/1984 | Hanlon et al. | |
| 4,477,360 | A | 10/1984 | Almond | |
| 4,534,870 | A * | 8/1985 | Williams | 507/211 |
| 4,657,081 | A * | 4/1987 | Hodge | 166/308.5 |
| 4,664,713 | A | 5/1987 | Almond et al. | |
| 4,749,041 | A | 6/1988 | Hodge | |
| 4,781,921 | A * | 11/1988 | Smith et al. | 524/555 |
| 4,797,216 | A * | 1/1989 | Hodge | 507/244 |
| 4,798,902 | A | 1/1989 | Putzig | |
| 4,960,527 | A * | 10/1990 | Penny | 507/211 |
| 5,082,579 | A * | 1/1992 | Dawson | 507/211 |
| 6,810,959 | B1 | 11/2004 | Qu et al. | |
| 6,814,145 | B2 * | 11/2004 | Maberry et al. | 166/294 |
| 2005/0043454 | A1 | 2/2005 | Ushida et al. | |

* cited by examiner

*Primary Examiner*—Timothy J. Kugel
*Assistant Examiner*—Atnaf Admasu
(74) *Attorney, Agent, or Firm*—Kathryn M. Sanchez

(57) ABSTRACT

A method for plugging a permeable zone or leak in a subterranean formation comprises introducing into the formation a cross-linkable organic polymer and a cross-linking composition which comprises a zirconium triethanolamine complex, a tetra(hydroxyalkyl)ethylenediamine, water and optionally, a polyol. The method can be used for cross-linking organic polymers over a wide range of pH. By varying the composition and optionally adding a delay agent, the method provides flexibility in rate of cross-linking.

14 Claims, No Drawings

PERMEABLE ZONE AND LEAK PLUGGING USING CROSS-LINKING COMPOSITION COMPRISING ZIRCONIUM TRIETHANOLAMINE COMPLEX

FIELD OF THE INVENTION

The invention relates to the field of plugging permeable zones and leaks in subterranean formations using a cross-linking composition. The cross-linking composition comprises a cross-linking agent which is a zirconium triethanolamine complex.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates are usually incorporated into the composition to control viscosity.

Normally, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through zones depleted of oil (so-called "thief zones") rather than through those parts of the strata which contain sufficient oil to make oil-recovery operations profitable.

Difficulties in oil recovery due to high permeability of zones may be corrected by injecting an aqueous solution of an organic polymer and a cross-linking agent into certain subterranean formations under conditions where the polymer will be cross-linked to produce a gel, thus reducing the permeability of such subterranean formations to driving fluid (gas, water, etc.). Polysaccharide- or partially hydrolyzed polyacrylamide-based fluids cross-linked with certain aluminum, titanium, zirconium and boron-based compounds are also used in these enhanced oil recovery applications.

Cross-linked fluids or gels, whether for fracturing a subterranean formation or for reducing permeability of a subterranean formation, are now being used in hotter, deeper wells under a variety of pH conditions, where rates of cross-linking with known cross-linking compositions may be unacceptable. Rather than developing new cross-linking agents for these new conditions, the oil well service companies may add delay agents that effectively delay the cross-linking of a particular metal cross-linking agent under these conditions.

A number of patents disclose the use of various delay agents in combination with particular cross-linking agents for which they are effective. These patents typically specify adding one or more ingredients to a cross-linking composition or specify particular operating conditions, such as a narrow range of pH. There are only a limited number of disclosed delay agents suitable for titanium and zirconium cross-linking agents. Thus, use of delay agents with titanium and zirconium cross-linking agents has limited flexibility for use by the oil well service companies to stimulate or enhance recovery of oil or gas from a well or other subterranean formation.

There is a need for a more effective method for flexibility in cross-linking compositions in oil recovery applications, such as hydraulic fracturing and plugging permeable zones and leaks. There is also a need to be able to control rate of cross-linking in oil recovery applications so that a range of cross-linking rates and may be achieved over a range of pH conditions with a single cross-linking composition. The present invention meets these needs.

SUMMARY OF THE INVENTION

This invention provides a method for plugging a permeable zone or leak in a subterranean formation which comprises using a cross-linking composition which comprises a zirconium triethanolamine complex, a tetra(hydroxyalkyl)ethylenediamine, water, a cross-linkable organic polymer, and optionally, a polyol.

The method for plugging a permeable zone or a leak in a subterranean formation comprises into said zone or said leak, the cross-linking composition. The cross-linkable organic polymer and the zirconium triethanolamine complex may be contacted prior to their introduction into the formation. Alternatively, the components of the cross-linking composition may be introduced separately into the formation such that cross-linking occurs within the formation. Surprisingly, a range of temperature, pH and other conditions can be tolerated and delay times controlled to provide flexibility by adjusting relative amounts of components, including cross-linking agent and delay agents.

DETAILED DESCRIPTION OF THE INVENTION

This invention provides methods for use of a cross-linking composition, comprising a zirconium-based cross-linking agent, which is a triethanolamine complex and a tetra(hydroxyalkyl)ethylenediamine and water. By varying the molar ratio between the zirconium complex and the hydroxylamine, in combination with optional components, such as a polyol, delay agent, etc., a series of zirconium-based compositions can be made which are effective as cross-linking agents over a pH range of 3-12 in oil well applications such as hydraulic fracturing and plugging of permeable zones.

The zirconium complex is a zirconium triethanolamine complex, such as bistriethanolamine zirconate or tetra-triethanolamine zirconate. Preferably the zirconium triethanolamine complex is tetra-triethanolamine zirconate. Tetra-triethanolamine zirconate can readily be made by processes known to those skilled in the art. Alternatively, tetra-triethanolamine zirconate available commercially from E.I. du Pont de Nemours and Company, Wilmington, Del., under the name Tyzor® TEAZ organic zirconate.

The tetra(hydroxyalkyl)ethylenediamine preferably has the formula $R^1(R^2)$—N—$CH_2$—$CH_2$—N'—$R^3(R^4)$ where $R^1, R^2, R^3$ and $R^4$ are independently selected from the group consisting of hydroxyethyl, hydroxy-n-propyl or hydroxyisopropyl groups. More preferably the tetra(hydroxyalkyl)ethylenediamine is selected from the group consisting of N,N,N',N'-tetrakis-(hydroxyisopropyl)ethylenediamine and N,N,N',N'-tetrakis-(2-hydroxyethyl)ethylenediamine and combinations thereof. Most preferred is N,N,N',N'-tetrakis(hydroxyisopropyl)ethylenediamine, which is available commercially, for example, from BASF Corporation, Mount Olive, N.J., under the name Quadrol® polyol.

The cross-linking composition typically comprises from about 0.01 to about 5 moles of tetra(hydroxyalkyl)ethylenediamine and about 0.01 to about 10 moles of water per mole of zirconium triethanolamine complex. Preferably the composition comprises from about 0.25 to about 2.0 moles of tetra(hydroxyalkyl)ethylenediamine per mole of zirconium triethanolamine complex. Preferably the composition comprises about 1.0 to about 5.0 moles of water per mole of zirconium triethanolamine complex.

Optionally, the composition may comprise a polyol. Addition of a polyol affects the rate of cross-linking of a cross-linkable organic polymer by the composition. Preferably the polyol is selected from the group consisting of glycerol, 1,1,1-tris(hydroxymethyl)ethane, 1,1,1-tris(hydroxymethyl)propane, pentaerythritol and sorbitol. More preferably the polyol is glycerol.

The amount of polyol is typically from about 0.0 to about 5.0 moles, preferably from about 0.5 to about 2.0 moles, per mole of zirconium triethanolamine complex.

The composition may further comprise a delay agent wherein the delay agent is a hydroxyalkylaminocarboxylic acid. Preferably, when the composition comprises a delay agent the delay agent is selected from the group consisting of bishydroxyethylglycine, bishydroxymethylglycine, bishydroxypropylglycine, bishydroxyisopropylglycine, bishydroxybutylglycine, monohydroxyethylglycine, monohydroxymethylglycine and their alkali metal salts. More preferably the delay agent is bishydroxyethylglycine.

The composition may also further comprise a cross-linkable organic polymer. Examples of suitable cross-linkable organic polymers include solvatable polysaccharides, polyacrylamides and polymethacrylamides. Preferably the organic polymer is a solvatable polysaccharides and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Gum derivatives include hydroxyethylguar (HEG), hydroxypropylguar (HPG), carboxyethylhydroxyethylguar (CEHEG), carboxymethylhydroxypropylguar (CMHPG), carboxymethyl guar (CMG), and the like. Cellulose derivatives include those containing carboxyl groups, such as carboxymethylcellulose (CMC), carboxymethylhydroxyethylcellulose (CMHEC), and the like. The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation.

The cross-linkable polymer is normally mixed with a solvent such as water or mixed water/organic solvent or with an aqueous solution to form a base gel. Organic solvents that may be used include alcohols, glycols polyols, hydrocarbons such as diesel. As an example, the polymer may be mixed with water, a water/alcohol mixture (e.g., where the alcohol is methanol or ethanol), or an aqueous solution comprising a clay stabilizer. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the total weight of the cross-linking composition.

The composition may comprise an effective amount of a pH buffer to control pH. The pH buffer may be acidic, neutral or basic. The pH buffer is generally capable of controlling the pH from about pH 3 to about pH 12. For example, in a composition for use at pH of about 4-5, an acetic acid-based buffer can be used. In a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

The composition may comprise optional components, including those which are common additives for oil field applications. Thus, the composition may further comprise one or more of proppants, friction reducers, bactericides, hydrocarbons, chemical breakers, stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, ammonium persulfate. Stabilizers include methanol, alkali metal thiosulfate, ammonium thiosulfate. Stabilizers may also include clay stabilizers such as hydrochloric acid and chloride salts, for example, tetramethylammonium chloride (TMAC) or potassium chloride.

These optional components are added in an effective amount sufficient to achieve the desired cross-linking performance based on the individual components, desired delay in cross-linking time, temperature and other conditions present in the formation being fractured or permeable zone being plugged.

The cross-linking composition is produced by mixing the zirconium triethanolamine complex with the tetra(hydroxyalkyl)ethylene, water and optional components, in any order. For example, in a particular application in the oil field, the zirconium triethanolamine complex may be premixed with the tetra(hydroxyalkyl)ethylenediamine, water and optional polyol and introduced into a formation. The cross-linkable organic polymer can be introduced into the formation as a separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

When the composition comprises the polymer, the composition is useful in oil field applications such as in a method for hydraulically fracturing a subterranean formation and in a method for plugging a permeable zone or leak in a subterranean formation.

Thus, this invention provides a method for hydraulically fracturing a subterranean formation, which comprises introducing into the formation a cross-linking composition comprising a zirconium triethanolamine complex, a tetra(hydroxyalkyl)ethylenediamine, water, a cross-linkable organic polymer, and optionally, a polyol, a delay agent, a pH buffer and combinations of two or more thereof, at a flow rate and pressure sufficient to create, reopen, and/or extend one or more fractures in the formation.

In one embodiment of the method for hydraulically fracturing a subterranean formation, the cross-linking composition and the cross-linkable polymer are contacted prior to their introduction into the formation, such that the cross-linking agent and polymer react to form a cross-linked gel, wherein the gel is introduced into the formation. In this method, a cross-linking composition is prepared by mixing a zirconium triethanolamine complex, a tetra(hydroxyalkyl)ethylenediamine, water and optionally, a polyol. A base gel is prepared by mixing a cross-linkable organic polymer with a solvent, wherein the solvent is water, or mixed water/organic solvent or with an aqueous solution. This method further comprises contacting the cross-linking composition with the base gel; permitting the cross-linking composition and the base gel to react, to form a cross-linked gel; and introducing the cross-linked gel into the formation at a flow rate and pressure sufficient to create, reopen, and/or extend a fracture in the formation. The cross-linking composition, the base gel, or both may further comprise a delay agent and/or a pH buffer.

Alternatively, the subterranean formation may be penetrated by a wellbore, such that contacting the cross-linking composition with the base gel occurs in the wellbore and the cross-linked gel is introduced into the formation from the wellbore. This method of hydraulically fracturing a subterranean formation penetrated by a wellbore comprises (a) preparing a cross-linking composition by mixing a zirconium triethanolamine complex, a tetra(hydroxyalkyl)ethylenediamine, water and optionally, a polyol; (b) preparing a base gel by mixing a cross-linkable organic polymer with a solvent, wherein the solvent is water, or mixed water/organic solvent or with an aqueous solution; (c) introducing the base gel into the wellbore; (d) simultaneously with or sequentially after, introducing the base gel into the wellbore, introducing the cross-linking composition into the wellbore; (e) permitting the base gel and the cross-linking composition to react to form a cross-linked aqueous gel; and (f) introducing the cross-linked gel into the formation from the wellbore at a flow rate and pressure sufficient to create, reopen, and/or extend a fracture in the formation. A pH buffer, a delay agent which is a hydroxyalkylaminocarboxylic acid, or both may be independently admixed with the base gel, the cross-linking composition or both prior to introducing the base gel and the cross-linking composition into the wellbore.

Upon creation of a fracture or fractures, the method may further comprise introducing a cross-linking composition comprising a zirconium triethanolamine complex, a tetra(hydroxyalkyl)ethylenediamine, water, a cross-linkable organic polymer, proppant, and optionally, a polyol into the fracture or fractures. This second introduction of a cross-linking composition is preferably performed in the event the cross-linking composition used to create the fracture or fractures did not comprise proppant. The cross-linking composition may subsequently be recovered from the formation.

Another use for the cross-linking composition of the present invention relates to a method for selectively plugging permeable zones and leaks in subterranean formations which comprises introducing into the permeable zone or the site of the subterranean leak a cross-linking composition comprising a zirconium triethanolamine complex, a tetra(hydroxyalkyl)ethylenediamine, a cross-linkable organic polymer, water, and optionally, a polyol, into the permeable zone or the site of the subterranean leak. A pH buffer, a delay agent which is a hydroxyalkylaminocarboxylic acid, or both, may be admixed with the cross-linking composition prior to introducing the cross-linking composition into the permeable zone or site of the leak.

In a first embodiment of the method for plugging a permeable zone or a leak in a subterranean formation, the cross-linkable organic polymer and the cross-linking composition are contacted prior to their introduction into the subterranean formation, such that the polymer and cross-linking agent react to form a cross-linked aqueous gel, which gel is then introduced into the formation.

In an alternative embodiment of the method for plugging a permeable zone or a leak in a subterranean formation, the cross-linking composition and the cross-linkable organic polymer are introduced separately, either simultaneously or sequentially, into the permeable zone or the site of the subterranean leak such that cross-linking occurs within the subterranean formation. This method comprises (a) preparing a cross-linking composition by mixing a zirconium triethanolamine complex, a tetra(hydroxyalkyl)ethylenediamine, water and optionally, a polyol; (b) preparing a base gel by mixing a cross-linkable organic polymer with a solvent, wherein the solvent is water, or mixed water/organic solvent or with an aqueous solution; (c) introducing the base gel into the into the permeable zone or the site of the subterranean leak; (d) simultaneously with or sequentially after, introducing the base gel into the into the permeable zone or the site of the subterranean leak, introducing the cross-linking composition into the into the permeable zone or the site of the subterranean leak; (e) permitting the base gel and the cross-linking agent to react to form a cross-linked aqueous gel to plug the zone and/or leak.

The relative amounts of cross-linkable organic polymer and the cross-linking composition may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the zirconium triethanolamine complex, with percentages being based on the total weight. Preferably, from about 0.25 to about 0.75 weight % of the cross-linkable organic polymer is used and from about 0.05 to about 0.25 weight % of the zirconium triethanolamine complex is used.

In a method for plugging permeable zones or leaks, generally about 0.25 to 1.2 weight % of a cross-linkable organic polymer is used, preferably 0.40 to 0.75 weight %, based on the total weight. Generally about 0.01 to 0.50 weight % of the zirconium triethanolamine complex is used, preferably 0.05 to 0.25 weight %, based on the total weight.

The amount of zirconium triethanolamine complex used to cross-link the organic polymer is that which provides a zirconium ion concentration in a range from about 0.0005 weight % to about 0.1 weight %, based on the total weight. The preferred concentration of zirconium ion is in the range of from about 0.001-0.05 weight %, based on the total weight.

Typically the cross-linking composition of this invention can be used at a pH of from about 3 to 11. For low temperature applications (150°-250° F., 66°-482° C.), carbon dioxidebased energized fluids may be used. In this case, a pH for the cross-linking composition of about 3 to about 6 is preferred. For higher temperature applications (300° F.-400° F., 149°-204° C.), a pH of about 9 to about 11 is preferred. The cross-linking composition selected for use will vary dependent on the pH being used.

EXAMPLES

Test Methods

Preparation of a Base Gel:

One liter of tap water was added to a Waring blender jar equipped with a three bladed paddle stirrer. Agitation was started and 3.6 g of a polysaccharide polymer was added, followed by a clay stabilizer (tetramethylammonium chloride) and a buffer selected to adjust the pH to 4.0-7.0 to provide a solution. The rate of agitation was adjusted to maintain a slight vortex at the top of the solution and agitation continued for 30 minutes, which produced a "30 lb/1000 gallon" base gel. After 30 minutes, the pH of the base gel was adjusted to the desired final pH with (1) an acetic acid-based buffer for pH 4-5; (2) a fumaric acid or sodium diacetate-based buffer for pH 5-7; (3) a sodium bicarbonate-based buffer for pH 7-8.5; or (4) a sodium carbonate or sodium hydroxide-based buffer for pH 9-11. Agitation was stopped and the base gel allowed to sit for 30 minutes.

Alternatively, for a "20 lb/1000" gallon base gel, 2.4 g of polymer was added to one liter of tap water. For a "60 lb/1000" gallon base gel, 7.2 g of polymer was added to one liter of tap water.

Vortex Closure Test:

A 250 ml portion of base gel was measured into a clean Waring blender jar. Agitation was started and the rate adjusted to create a vortex exposing the blade nut. The setting on the Variac controlling the blender speed was recorded and kept constant for all tests for reproducibility. An amount of cross-linking agent was injected into the edge of the vortex of the agitated base gel and a stopwatch immediately started, which set time=0. When the viscosity of the gel increased sufficiently to allow the fluid to cover the nut on the blade of the blender jar and the vortex remained closed, the time was recorded. This time, that is the difference between the time the stopwatch started and the time the vortex remained closed, is the vortex closure time. If the vortex had not closed within 10 minutes, the test was discontinued and a vortex closure time of greater than 10 minutes was recorded. The beginning and final pH of the cross-linked gel were also recorded as pHb and pHf, respectively. Such vortex closure tests provide a means for obtaining a reasonably good estimate of the time required to complete cross-linking of the polymer by the cross-linking agent. Complete closure of the vortex indicates a substantial degree of cross-linking.

The test was repeated using the same base gel and cross-linking agent. However, a specified amount of bishydroxy-ethylglycine delay agent was injected immediately following the injection of the cross-linking agent. The vortex closure time was recorded in a similar fashion. Results for the cross-linking compositions are provided below.

Note 1: 0.2% by weight of the total composition of tetramethyl ammonium chloride was used as clay stabilizer.

Note 2: A 30 lb/1000 gallon carboxymethylcellulose (CMC) base gel, prepared in 1 gal/1000 gal of 50% TMAC solution in water was used to measure the vortex closure times at pH 4.

Note 3: A 20 lb/1000 gal carboxymethylcellulose (CMC) base gel, prepared in 1 gal/1000 gal of 50% TMAC solution in water was used to measure the vortex closure times at pH 5.

Note 4: A 60 lb/1000 gal carboxymethylhydroxypropylguar (CMHPG) base gel was used to measure the vortex closure times at pH 10.

Example 1

A 500-ml flask, equipped with a thermocouple, dropping funnel, nitrogen bleed and condenser was charged with 200 g of tetra-n-propyl zirconate solution in n-propyl alcohol containing 20.7% Zr (available from E.I. du Pont de Nemours and Company). Agitation was started and 135.3 g of triethanolamine were added. The mixture was heated to 60° C. and held there for 2 hours. Next, 62.3 g of tetrakis(2-hydroxypropyl)ethylenediamine (Quadrol® polyol, available from BASF Corp.) and a mixture of 21 g of glycerol and 21 g of water were added. The solution was agitated for another 2 hours at 60° C. to give 439 g of an orange solution containing 9.3% Zr.

Example 2

A 500-ml flask, equipped with a thermocouple, dropping funnel, nitrogen bleed and condenser was charged with 313.7 g of zirconium tetra-triethanolamine complex (available from E. I. du Pont de Nemours and Company). Agitation was started and 132.6 g of tetrakis(2-hydroxypropyl)ethylenediamine were added. The solution was agitated for 2 hours at 60° C. to give 446 g of an orange solution containing 9.3% Zr.

Example 3-14

The process of Example 2 was repeated for Examples 3-14. In each Example, 313.7 g of zirconium tetra-triethanolamine complex was added. The amounts of Quadrol® polyol, glycerol and water added in each Example are provided in Table 1.

TABLE 1

| Example | Quadrol ® polyol, g | Glycerol, g | Water, g |
| --- | --- | --- | --- |
| 3 | 132.6 | 42 | 42 |
| 4 | 66.3 | 21 | 42 |
| 5 | 132.6 | 21 | 21 |
| 6 | 66 | 21 | 21 |
| 7 | 132.6 | | 21 |
| 8 | 132.6 | 21 | |
| 9 | 132.6 | 21 | 42 |
| 10 | 132.6 | 42 | |
| 11 | 132.6 | 42 | 21 |
| 12 | 132.6 | | 42 |
| 13 | 66.3 | 21 | |
| 14 | 66.3 | | |

The Vortex Closure Times were measured for the compositions of each of Examples 1-14. In addition, the Vortex Closure Time was measured for a commercial product, zirconium tetra-triethanolamine complex, Tyzor® TEAZ organic zirconate. The Closure Times were measured at pH 4 and at pH 5 using the Vortex Closure Test in accordance with Notes 2 and 3 above. The results are provided below in Table 2.

TABLE 2

Vortex Closure Times at pH 4 and 5

| Example. No. | %Zr | Zr[a] moles | TEA[b] moles | HPED[c] moles | Glycerol moles | Water moles | gpt[d] | Vortex Closure Time (min.) pH 4 | gpt[d] | Vortex Closure Time (min.) pH 5 |
|---|---|---|---|---|---|---|---|---|---|---|
| Zr-TEA[e] | 13.2 | 1 | 4 | 0 | 0 | 0 | 0.32 | 10:00 | 0.48 | 0:32 |
| 1 | 9.3 | 1 | 2 | 0.5 | 0.5 | 2.5 | 0.68 | 1:19 | 1.04 | 1:12 |
| 2 | 9.3 | 1 | 4 | 1 | 0 | 0 | 0.44 | 0:53 | 0.68 | 0:01 |
| 3 | 7.8 | 1 | 4 | 1 | 1 | 5 | 0.52 | 1:02 | 0.80 | 0:55 |
| 4 | 8.9 | 1 | 4 | 0.5 | 1 | 5 | 0.48 | 1:14 | 0.80 | 3:28 |
| 5 | 8.5 | 1 | 4 | 1 | 0.5 | 2.5 | 0.48 | 0:48 | 0.72 | 1:02 |
| 6 | 9.8 | 1 | 4 | 0.5 | 0.5 | 2.5 | 0.44 | 0:40 | 0.64 | 1:07 |
| 7 | 8.9 | 1 | 4 | 1 | 0 | 2.5 | 0.48 | 0:23 | 0.68 | 0:03 |
| 8 | 8.9 | 1 | 4 | 1 | 0.5 | 0 | 0.48 | 0:51 | 0.68 | 0:31 |
| 9 | 8.1 | 1 | 4 | 1 | 0.5 | 5 | 0.52 | 0:37 | 0.76 | 0:59 |
| 10 | 8.5 | 1 | 4 | 1 | 1 | 0 | 0.48 | 2:34 | 0.72 | 0:41 |
| 11 | 8.1 | 1 | 4 | 1 | 1 | 2.5 | 0.52 | 1:27 | 0.76 | 0:24 |
| 12 | 8.5 | 1 | 4 | 1 | 0 | 5 | 0.48 | 0:38 | 0.72 | 0:01 |
| 13 | 10.3 | 1 | 4 | 0.5 | 0.5 | 0 | 0.40 | 1:18 | 0.60 | 0:17 |
| 14 | 10.9 | 1 | 4 | 0.5 | 0 | 0 | 0.36 | 2:16 | 0.56 | 0:10 |

[a]Zr refers to the molar amount of the zirconium complex, prepared according to each of the Examples 1–14, and the molar amount of the commercial zirconium tetra-triethanolamine complex used in the test.
[b]TEA is triethanolamine.
[c]HPED is tetrakis(2-hydroxypropyl)ethylenediamine (Quadrol ® polyol, available from BASF Corp.).
[d]gpt means gallons per thousand gallons.
[e]Zr-TEA is zirconium tetra-triethanolamine complex.

Table 2 shows that by increasing the level of hydroxyalkyl ethylenediamine, tetrakis(2-hydroxypropyl)ethylenediamine, HPED, while holding the levels of glycerol and water constant, the rate of cross-linking increases at both pH 4 and pH 5. Increasing the level of water while holding the levels of HPED polyol and glycerol constant increases the rate of cross-linking at pH 4, with little effect at pH 5. Holding the level of HPED polyol and water constant and increasing the level of glycerol, however, slows the rate of cross-linking. Therefore, by proper selection of the level of HPED polyol, glycerol and water used, the rate of cross-linking can be adjusted to be faster or slower to match the desired rate for a given application.

Comparative Example A

A 1000 ml flask equipped with agitation, a condenser, a dropping funnel, a thermocouple and a nitrogen bleed was charged with 352 g (0.799 mol) of tetra-n-propyl zirconate. Agitation was started and 230.8 g (0.83 mol) of hydroxyethyl-tris-(2-hydroxypropyl)ethylenediamine, available commercially from Tomen Corporation, Tokyo, Japan, were added. The reaction mass was heated to 60° C. and held there for 2 hours. On completion of the hold period the reaction mass was cooled to room temperature to yield a viscous, clear yellow liquid containing 12.3% Zr.

Comparative Example B

A 1000 ml flask equipped with agitation, a condenser, a dropping funnel, a thermocouple and a nitrogen bleed was charged with 364 g (0.826 mol) of tetra-n-propyl zirconate. Agitation was started and 493.4 g (3.3 mol) of triethanolamine were added. The reaction mass was heated to 60° C. and held there for 2 hours. On completion of the hold period, a 20 mm Hg vacuum was applied and the liberated n-propanol was removed. The reaction mass was then cooled to room temperature to yield a viscous, clear yellow liquid containing 13.2% Zr.

Comparative Example C

A 1000 ml flask equipped with agitation, a condenser, a dropping funnel, a thermocouple and a nitrogen bleed was charged with 368.6 g (0.609 mol) of zirconium oxychloride 30% solution. Agitation was started and 40 g (0.83 mol) of water were added. Next, 181.3 g (1.77 mol) of 85% lactic acid were rapidly added under high speed agitation, while temperature was maintained at 20-30° C. The reaction mass was stirred an additional hour at 20-30° C. and then neutralized to pH 6.7-7.3 with 25% aqueous sodium hydroxide solution. The reaction mass was then heated to 80° C. and held there for 4 hours. On completion of the hold period, the reaction mass was cooled to room temperature to yield a clear, pale yellow liquid containing 5.4% Zr.

The Vortex Closure Times were measured for the compositions of each of the Comparative Examples A-C, in addition to compositions of Examples 2, 7, 8, 10 and 12. The Closure Times were measured at pH 10 using the Vortex Closure Test in accordance with Note 4 above. For higher temperature applications, base gel fluids with a higher polymer loading 50-60 lb/1000 gal) and a higher pH (pH 9-11) are typically used. Under these conditions, a cross-linking rate in the Vortex Closure Test of between 1 minute and 5 minutes is generally preferred. The results are provided below in Table 3.

TABLE 3

Vortex Closure Times at pH 10

| Example | % Zr | Zr[a] moles | TEA[b] moles | HPED[c] moles | Glycerol moles | Water moles | gpt[d] | Vortex Closure Time (min.) pH 10 |
|---|---|---|---|---|---|---|---|---|
| Comp. A | 12.4 |   |   |   |   |   | 1.44 | >10 |
| Comp. B | 13.2 | 1 | 4 | 0 | 0 | 0 | 1:36 | 0:14 |
| Comp. C | 5.4 |   |   |   |   |   | 3:36 | 0.05 |
| 2 | 9.3 | 1 | 4 | 1 | 0 | 0 | 1.92 | 1:05 |
| 7 | 8.9 | 1 | 4 | 1 | 0 | 2.5 | 2.0 | 2:16 |
| 8 | 8.9 | 1 | 4 | 1 | 0.5 | 0 | 2.0 | 3:35 |
| 10 | 8.5 | 1 | 4 | 1 | 1 | 0 | 2:08 | 2:56 |
| 12 | 8.5 | 1 | 4 | 1 | 0 | 5 | 2:12 | 4:28 |

[a] Zr refers to the molar amount of the zirconium complex, prepared according to each of the Examples 1–14, and the molar amount of the commercial zirconium tetra-triethanolamine complex used in the test.
[b] TEA is triethanolamine.
[c] HPED is tetrakis(2-hydroxypropyl)ethylenediamine (Quadrol ® polyol, available from BASF Corp.).
[d] gpt means gallons per thousand gallons.

Table 3 shows that by proper selection of the levels of tetrakis(2-hydroxypropyl)ethylenediamine, glycerol and/or water, the cross-linking composition of this invention provide cross-linking times in the desired 1-5 minute range. Table 3 also shows the Comparative zirconate cross-linking compositions, which do not comprise zirconium triethanolamine complex and a tetra(hydroxyalkyl)ethylenediamine, have closure times which are either too fast or too slow.

What is claimed is:

1. A method for plugging a permeable zone or leak in a subterranean formation which comprises introducing a cross-linking composition comprising bistriethanolamine zirconate or tetra-triethanolamine zirconate, N,N,N',N'-tetrakis-(hydroxyisopropyl)ethylenediamine, a cross-linkable organic polymer, water, and optionally, a polyol, into the permeable zone or the leak wherein a pH buffer is admixed with the composition prior to introducing the cross-linking composition into the permeable zone or the leak to provide a pH of 3-12.

2. The method of claim 1 wherein a delay agent which is a hydroxyalkylaminocarboxylic acid, is admixed with the cross-linking composition prior to introducing the cross-linking composition into the permeable zone or the leak.

3. The method of claim 1 wherein the cross-linking composition further comprises a polyol wherein the polyol is selected from the group consisting of glycerol,1,1,1-tris(hydroxymethyl)ethane, 1,1,1-tris(hydroxymethyl)propane, pentaerythritol and sorbitol.

4. The method of claim 1 wherein the organic polymer is a solvatable polysaccharides and is selected from the group consisting of gums, gum derivatives and cellulose derivatives.

5. The method of claim 4 wherein the organic polymer is hydroxypropylguar (HPG), carboxymethylcellulose (CMC), or carboxymethylhydroxypropylguar (CMHPG).

6. The method of claim 5 wherein the organic polymer is hydroxypropylguar (HPG).

7. The method of claim 5 wherein the organic polymer is carboxymethylcellulose (CMC), or carboxymethylhydroxypropylguar (CMHPG) and the pH of the composition is less than 6.0 or higher than 9.0.

8. A method for plugging a permeable zone or leak in a subterranean formation comprising:

(a) preparing a cross-linking composition by mixing bis-triethanolamine zirconate or tetra-triethanolamine zirconate, N,N,N,N'-tetrakis-(hydroxyisopropyl)ethylenediamine, water and optionally, a polyol;

(b) preparing a base gel by mixing a cross-linkable organic polymer with a solvent, wherein the solvent is water, or mixed water/organic solvent or with an aqueous solution;

(c) introducing the base gel into the permeable zone or the site of the subterranean leak;

(d) simultaneously with or sequentially after, introducing the base gel into the permeable zone or the leak, introducing the cross-linking composition into the permeable zone or the leak;

(e) permitting the base gel and the cross-linking agent to react to form a cross-linked aqueous gel to plug the zone or leak, wherein a pH buffer is added to the base gel, the cross-linking composition or both, to provide a pH of 3 to 12.

9. The method of claim 8 wherein a delay agent which is a hydroxyalkylaminocarboxylic acid is added to the base gel, the cross-linking composition or both.

10. The method of claim 8 wherein the cross-linking composition further comprises a polyol wherein the polyol is selected from the group consisting of glycerol, 1,1,1-tris(hydroxymethyl)ethane, 1,1,1-tris(hydroxymethyl)propane, pentaerythritol and sorbitol.

11. The method of claim 8 wherein the organic polymer is a solvatable polysaccharides and is selected from the group consisting of gums, gum derivatives and cellulose derivatives.

12. The method of claim 11 wherein the organic polymer is hydroxypropylguar (HPG), carboxymethylcellulose (CMC), or carboxymethylhydroxypropylguar (CMHPG).

13. The method of claim 12 wherein the organic polymer is hydroxypropylguar (HPG).

14. The method of claim 12 wherein the organic polymer is carboxymethylcellulose (CMC), or carboxymethylhydroxypropylguar (CMHPG) and the pH of the composition is less than 6.0 or higher than 9.0.

* * * * *